United States Patent [19]
Wignot et al.

[11] Patent Number: 5,130,669
[45] Date of Patent: Jul. 14, 1992

[54] APPARATUS FOR DRIVING A MECHANICAL RESONATOR FROM A HIGH IMPEDANCE SOURCE

[75] Inventors: Leroy S. Wignot; Gene K. Sendelweck, both of Indianapolis; Daniel M. Hutchinson, Carmel, all of Ind.

[73] Assignee: Thomson Consumer Electronics, Inc., Indianapolis, Ind.

[21] Appl. No.: 506,769

[22] Filed: Apr. 12, 1990

[51] Int. Cl.$^5$ .............. H03F 3/191; H04N 5/62
[52] U.S. Cl. ................... 330/306; 330/148; 330/174; 358/196; 358/197
[58] Field of Search .......... 330/148, 174, 306; 358/184, 191.1, 196, 197

[56] References Cited

U.S. PATENT DOCUMENTS

| | | | |
|---|---|---|---|
| 2,308,258 | 1/1943 | Armstrong et al. | 330/174 X |
| 3,054,969 | 9/1962 | Harrison | 330/174 X |
| 3,091,659 | 5/1963 | Massman . | |
| 4,271,433 | 6/1981 | Therault | 358/191.1 |
| 4,316,220 | 2/1982 | Muterspaugh et al. | 358/196 |
| 4,376,953 | 3/1983 | Naimpally | 358/197 |
| 4,410,864 | 10/1983 | Muterspaugh et al. | 358/188 X |
| 4,818,959 | 4/1989 | Katoh | 333/191 X |

FOREIGN PATENT DOCUMENTS 9316  1/1977  Japan ................. 358/196

OTHER PUBLICATIONS

Sauerland et al, "Ceramic IF Filters for Consumer Products", *IEEE Spectrum*, Nov. 1968, pp. 112–126.

*Primary Examiner*—James B. Mullins
*Attorney, Agent, or Firm*—Joseph S. Tripoli; Peter M. Emanuel; Frederick A. Wein

[57] ABSTRACT

The present invention concerns a high impedance signal source driving a relatively low input impedance mechanical resonating device such as a ceramic filter having an input impedance which varies with frequency. The high impedance source is further loaded by a resonant circuit tuned to the center frequency of the mechanical resonating device. The skirts of the resonant tuned circuit decrease in impedance on both sides of the center frequency of interest substantially compensating for the change of circuit gain with frequency due to the change of input impedance with frequency of the ceramic filter.

6 Claims, 1 Drawing Sheet

APPARATUS FOR DRIVING A MECHANICAL RESONATOR FROM A HIGH IMPEDANCE SOURCE

BACKGROUND

The present invention concerns television receivers having circuitry for driving a mechanical resonator such as a ceramic filter or the like, and more particularly, for driving such a mechanical resonator from a high impedance source such that the input impedance of the mechanical resonator substantially loads the source. As used herein, television receiver is intended to include any television signal processor such as a VCR or monitor, with or without a display device such as a CRT.

Ceramic filters and other mechanical resonating devices are commonly used in television receivers. For example, the video processing circuitry following a detector for providing a composite signal including color video and intercarrier components will often have a 4.5 MHz ceramic filter trap for removing the sound intercarrier signal from the composite signal produced by the video detector. Additionally, the sound processing circuitry will often have a 4.5 MHz bandpass ceramic filter for passing the intercarrier 4.5 MHz sound subcarrier while eliminating the rest of the combined signal. It is recommended by manufacturers of integrated circuits including detectors in applications notes that combined signals should be coupled to the ceramic filters by a low output impedance source such as an emitter follower. However, in order to improve performance, e.g., to improve signal to noise ratios, it is sometimes necessary to provide extra voltage gain not available from an emitter follower. One economical way to achieve this extra gain is to move one of the signal chains, e.g., the sound chain, to the collector electrode of the emitter follower. Such an arrangement is shown in U.S. Pat. No. 3,091,659 (Massman).

It is herein recognized that when the output for one of the signal chains, e.g., the sound chain, is moved to a transistor collector electrode, a problem arises because the output source impedance of the collector electrode of the transistor is high (typically more than 100 Kohms). This output source impedance is much more than, e.g., 10 times, the input impedance of the ceramic filter which varies considerably with frequency. For example, the ceramic filter sound bandpass filter of the exemplary embodiment has a relatively low input impedance, e.g., about 400 ohms at the 4.5 MHz center frequency, and a much higher input impedance, e.g., 2–3 Kohms, at frequencies removed from the center frequency. Since the relatively low input impedance of the ceramic filter loads the high impedance signal source, the gain of the transistor circuit at the collector electrode changes with frequency according to the change of input impedance of the ceramic filter with frequency.

This input impedance versus frequency characteristic of the ceramic filter is generally negligible when the signal is coupled from a low source impedance, e.g., 50 ohms or a source impedance comparable to the input impedance of the ceramic filter, e.g., that provided by an emitter follower. However, when driving the ceramic filter from a high source impedance, the input impedance versus frequency characteristic of the ceramic filter becomes an undesirable factor since it causes an increase in gain at frequencies, such as at the 3.58 MHz color subcarrier frequency, that the bandpass filter is intended to filter out. Accordingly, it is desirable to provide an economical way for providing extra gain by driving the mechanical resonant device such as a ceramic filter from the collector electrode of a transistor (rather than at the emitter electrode), while overcoming the input impedance loading effect of the ceramic filter on the high impedance signal source provided at the collector electrode.

SUMMARY OF THE INVENTION

Briefly, the present invention concerns a high impendance signal source driving a relatively low input impedance mechanical resonating device such as a ceramic filter having an input impedance which varies with frequency. The high impedance source is augmented by a resonant circuit tuned to the center frequency of the mechanical resonating device. The skirts of the resonant tuned circuit rapidly decrease in impedance on both sides of the center frequency of interest substantially compensating for the change of circuit gain with frequency due to change of the input impedance with frequency of the ceramic filter. Thus, the change of impedance with frequency characteristic of resonant circuit is complementary to the change of input impedance with frequency characteristic of ceramic filter.

DESCRIPTION OF THE DRAWINGS

Reference may be had to the drawings wherein.

DETAILED DESCRIPTION OF THE PREFERRED EMBODIMENT

Figure 1:
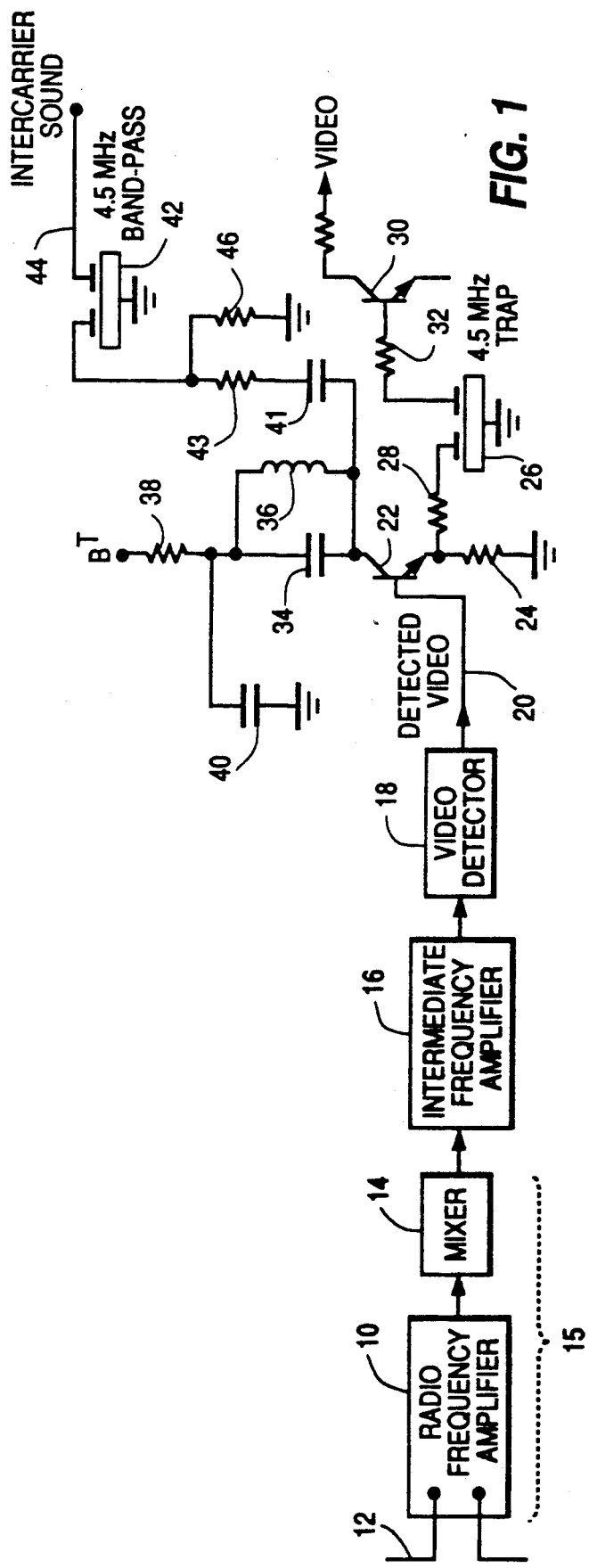
FIG. 1 shows a partial block diagram and a partial schematic of portions of a television receiver, according to aspects of the present invention.

Referring now to the Drawings, wherein like members have been designated with like numbers, there is shown in FIG. 1 pertinent portions of a television receiver. A television signal is received at antenna terminals 12 from an antenna receiving off the air broadcasts, or from a cable system, VCR, or the like, and is fed to a radio frequency (RF) amplifier 10 which in turn couples the signal to a mixer 14. Both amplifier 10 and mixer 14 are portions of a tuner which selects the desired signal and converts it to an intermediate frequency (IF) signal for further processing. The IF signal is amplified in an intermediate frequency amplifier 16 and then coupled to a video detector 18. The detected composite video signal includes a frequency modulated sound intercarrier signal at 4.5 MHz, and a video signal. The video signal includes a baseband luminance component and a phase modulated chrominance subcarrier signal at 3.58 MHz. The luminance component includes synchronization pulses. The present embodiment primarily concerns separation of the video and sound IF signals, and accordingly the other aspects of the composite signal will not be discussed further.

The detected composite signal at 20 is coupled to the base electrode of a transistor 22. Substantially the same amplitude composite signal is produced at the emitter electrode of transistor 22 across a resistor 24 and is coupled to a 4.5 MHz ceramic filter trap 26 through an isolation resistor 28. The sound modulated 4.5 MHz intercarrier sound signal is removed from the composite signal by trap 26 and the remaining video signal is coupled to a video processing section (not shown) for further processing by a transistor 30. The further processing of the video signal is not directly pertinent to the present invention and will not be further discussed herein.

In order to provide additional voltage gain to the intercarrier sound signal in order to improve the sound signal to noise ratio, in the exemplary embodiment the intercarrier sound signal is taken from the collector electrode (rather than the emitter electrode) of transistor 22. The collector electrode of transistor 22 is coupled to a capacitor 24 which is coupled in parallel with an inductor 36 thereby forming a parallel tuned resonant circuit. The values of capacitor 34 and inductor 36 are chosen to provide a resonance at the 4.5 MHz sound intercarrier frequency. Supply voltage is coupled to transistor 22 through a low pass filter comprising a resistor 38 and capacitor 40. The intercarrier sound signal developed at the collector electrode of transistor 22 is coupled through an optional DC decoupling capacitor 41 and an optional isolation resistor 43 to a ceramic filter 42 which is a bandpass filter centered at the 4.5 MHz intercarrier frequency. Bandpass filter 42 removes virtually all of the video signal which would otherwise be present.

Figure 3:
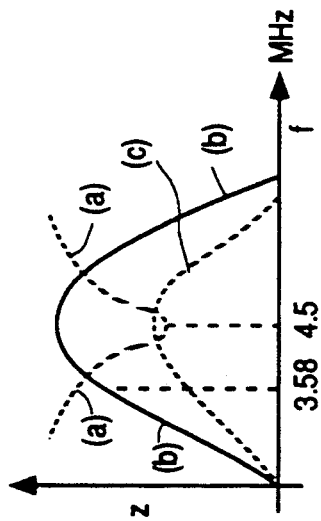
FIG. 3 shows a representative input impedance versus frequency characteristic of a ceramic filter, a tuned circuit, and the cumulative effect of the combination of the two, according to aspects of the present invention.

As discussed above, the output impedance at the collector electrode of a transistor is much higher than the frequency dependent input impedance of bandpass ceramic filter 42. The input impedance of filter 42 of the exemplary embodiment has a minimum value of about 400 ohms at the 4.5 MHz center frequency and rapidly increases to 2 or 3 Kohms on both sides of the center frequency. This input impedance versus frequency response is shown in FIG. 3 by curve "a" having a saddle or valley point and extending upwardly for frequencies removed from the center frequency of 4.5 MHz. Without tuned circuit 34/36, due to the AC loading of the relatively high output impedance collector electrode of transistor 22 by the relatively low input impedance bandpass filter 42, the gain versus frequency characteristic of transistor 22 produced at the collector electrode would vary according to the change of input impedance of bandpass filter 42 as shown in curve "a" of FIG. 3. This is undesirable since the resultant gain versus frequency characteristic is contrary to the desired bandpass filtering transfer characteristic of filter 42. Specifically, the resultant gain versus frequency is undesirable because it provides considerably higher gain, inter alia, at the undesirable 3.58 MHz chroma subcarrier frequency than at the desired 4.5 MHz intercarrier sound signal frequency. The higher amplitude 3.58 MHz color subcarrier signal can cause transistor 22 to clip or saturate (effect the dynamic range of transistor 22), and may produce undesirable components in the reproduced audio signal which may be especially noticeable when relatively wideband stereophonic processing is utilized.

Figure 2:
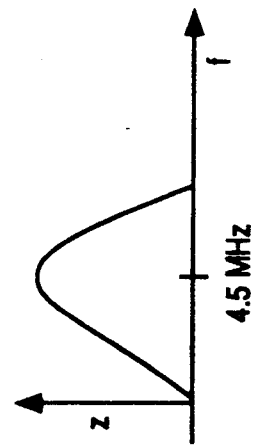
FIG. 2 is a representative impedance versus frequency characteristic of a tuned circuit having a center frequency of 4.5 MHz.

This change in gain versus frequency effect is overcome by the parallel tuned resonant circuit comprising capacitor 34 and inductor 36. Tuned circuit 34/36 has an impedance characteristic shown in FIG. 2 and curve "c" of FIG. 3. As shown, tuned circuit 34/36 has a high impedance at the desired frequency of 4.5 MHz but the impedance rapidly falls off at frequencies on both sides of 4.5 MHz. As a result, greater amplification is achieved at the collector electrode of transistor 22 at 4.5 MHz than at off-center frequencies such as 3.58 MHz. Thus, parallel resonant circuit 34/36 provides an impedance versus frequency characteristic "c" which is complimentary to that of input impedance of ceramic bandpass filter 42. The combination of the two characteristics produces a peaked response shown by curve "b" of FIG. 3.

The impedance versus frequency of the tuned circuit 34, 36 can be adjusted by selecting the proper L/C ratio, which determines the impedance of the parallel resonant circuit at the resonant frequency, and the proper "Q" of the parallel resonant circuit, which determines the slope of the skirts. In the exemplary embodiment, the inductor 36 is 2.2 microhenries and capacitor 34 is a 560 picofarad capacitor. The shape of the curve "c" can be tailored to take into account the effect of optional isolation resistor 43 and/or an optional shunt resistor 46 which are often used with ceramic filters and will slightly change the amplitude and slope of the curve "b" of FIG. 3.

The effect of parallel resonant tuned circuit 34/36 can be looked at in two ways. Firstly, it can be considered that the tuned circuit lowers source impedances at frequencies removed from the center frequency. This compensates for the change of loading due to the increase of the input impedance with frequency of ceramic filter 42. Secondly, the resonant circuit impedance "swamps out" the input impedance of the bandpass filter 42 at frequencies removed from the resonant frequency. As a result the gain of the transistor 22 at these removed frequencies is greatly reduced and compensates for the increase of gain which would be due to the increase of the input impedance of ceramic filter 42 at such removed frequencies.

A similar loading problem is not encountered with respect to the 4.5 MHz trap 26 in the video section since the video section is fed from the emitter electrode of the transistor which provides a low source impedance, typically much lower than the input impedance of trap 26.

In this manner, the tuned circuit 34, 36 introduces a complimentary impedance curve to that of the input impedance of ceramic filter 42, while still permitting substantial gain to be derived from transistor 22 at 4.5 MHz bandpass center frequency (where resonant circuit 34, 36 is resonant).

Although the present embodiment shows an NPN transistor, it is within the contemplation of the present invention that a PNP transistor can be used, or a FET of either the enhancement or depletion type in which case the drain electrode would be the high impedance output electrode, or any other appropriate device or circuit having a high impedance output for driving a ceramic filter or the like.

What is claimed is:
1. An amplifier circuit comprising:
  amplification means having a relatively high impedance signal output means for providing a signal over a bandwidth of frequencies,
  a first load means coupled in parallel with the high impedance signal output means, said first load means having a first impedance versus frequency characteristic with an impedance over a portion of the bandwidth which is relatively lower than the high impedance signal output means, and a second load means coupled in parallel with the high impedance signal output means, said second load means having a second impedance versus frequency characteristic which is complementary to the first impedance versus frequency characteristic with an impedance over a portion of the bandwidth which is relatively lower than the high impedance signal output means such that the amplitude versus frequency characteristic of a signal at the high impedance signal output means over the bandwidth is in part determined by the loading of the high impedance signal ouput means by the first load means and in part determined by the loading of the high impedance signal output means by the second load means.

2. The amplifier circuit of claim 1 wherein the first impedance versus frequency characteristic has a first higher input impedance portion and a first lower input impedance portion, and the second impedance versus frequency characteristic has a second lower impedance portion generally coincident in frequency with the first higher impedance portion and a second higher impedance portion generally coincident in frequency with the first lower impedance portion.

3. The amplifier circuit of claim 1 wherein first impedance versus frequency characteristic has two first higher impedance portions with a first low impedance portion therebetween, and the second impedance versus frequency characteristic has a second higher impedance portion substantially coincident in frequency with the first low impedance portion and two second low impedance portions substantially coincident in frequency with the two first higher impedance portions.

4. An amplifier circuit comprising:
amplification means having a relatively high impedance output means for providing a signal over a bandwidth of frequencies, said amplification means being a transistor having an emitter electrode providing a low impedance first signal output thereat, and a collector electrode providing a high impedance second signal output thereat,
a first load means coupled in parallel with the high impedance output means, said first load means having a first impedance versus frequency characteristic with an impedance over a portion of the bandwidth which is relatively lower than the high impedance output means, and
a second load means coupled in parallel with the high impedance signal output means, said second load means having a second impedance versus frequency characteristic which is complementary to the first input impedance versus frequency characteristic with an impedance over a portion of the bandwidth which is relatively lower than the high impedance signal output means such that the amplitude versus frequency characteristic of a signal at the high impedance signal output means over the bandwidth is in part determined by the loading of the high impedance signal output means by first load means and in part determined by the loading of the high impedance signal output means by the second load means.

5. The amplifier circuit of claim 4 wherein the first signal is a video signal and the second signal is a sound signal.

6. An amplifier circuit comprising:
amplification means having a relatively high impedance output means for providing a signal over a bandwidth of frequencies, said amplification means being a transistor having a collector electrode comprising the high impedance output means and providing a sound signal output thereat,
a first load means coupled in parallel with the high impedance output means, said first load means having a first impedance versus frequency characteristic and an impedance over a portion of the bandwidth which is relatively lower than the high impedance output means, and
a second load means coupled in parallel with the high impedance signal output means, said second load means having a second impedance versus frequency characteristic which is complementary to the first input impedance versus frequency characteristic and an impedance over a portion of the bandwidth which is relatively lower than the high impedance signal output means such that the amplitude versus frequency characteristic of a signal at the high impedance signal output means over the bandwidth is in part determined by the loading of the high impedance signal output means by the first load means and in part determined by the loading of the high impedance signal output means by the second load means.

* * * * *